U S009766632B2

(12) United States Patent
Volovec et al.

(10) Patent No.: US 9,766,632 B2
(45) Date of Patent: Sep. 19, 2017

(54) PRESSURE INDEPENDENT CONTROL AND BALANCING VALVES

(71) Applicant: IMI HYDRONIC ENGINEERING INTERNATIONAL SA, Eysins (CH)

(72) Inventors: Peter Volovec, Kapele (SI); Slavko Lah, Brezice (SI); Gregor Bozic, Krsko (SI)

(73) Assignee: IMI HYDRONIC ENGINEERING INTERNATIONAL SA, Elysins (CH)

( * ) Notice: Subject to any disclaimer, the term of this patent is extended or adjusted under 35 U.S.C. 154(b) by 90 days.

(21) Appl. No.: 14/770,021

(22) PCT Filed: Feb. 24, 2014

(86) PCT No.: PCT/EP2014/053539
§ 371 (c)(1),
(2) Date: Aug. 24, 2015

(87) PCT Pub. No.: WO2014/131727
PCT Pub. Date: Sep. 4, 2014

(65) Prior Publication Data
US 2016/0004256 A1   Jan. 7, 2016

(30) Foreign Application Priority Data

Feb. 28, 2013   (EP) ..................... 13157343

(51) Int. Cl.
G05D 7/01   (2006.01)
(52) U.S. Cl.
CPC .......... *G05D 7/014* (2013.01); *Y10T 137/353* (2015.04)
(58) Field of Classification Search
CPC ................ G05D 7/014; Y10T 137/353; Y10T 137/3367; Y10T 137/3421
See application file for complete search history.

(56) References Cited

U.S. PATENT DOCUMENTS 3,734,120 A * 5/1973 Rowe ................... G05D 16/106
                                                           137/220
4,747,426 A * 5/1988 Weevers ............... F16K 15/063
                                                           137/220
(Continued)

FOREIGN PATENT DOCUMENTS

WO   2010/103408 A2   9/2010
WO   2012/076167 A1   6/2012

OTHER PUBLICATIONS

International Search Report for PCT/EP2014/053539 (published as WO 2014/131727 A3), 3 pages, dated Aug. 25, 2014.

*Primary Examiner* — Craig Schneider
*Assistant Examiner* — Kevin Barss
(74) *Attorney, Agent, or Firm* — Heslin Rothenberg Farley & Mesiti P.C.

(57) ABSTRACT

A device having pressure independent control and balancing valves, suitable for use in a hydronic system, comprises a seat, a plug having an upstream surface and a downstream surface, and a piston, wherein the seat, plug and piston are aligned coaxially, a controller determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction.

18 Claims, 12 Drawing Sheets

(56) References Cited

U.S. PATENT DOCUMENTS

| | | | | |
|---|---|---|---|---|
| 6,029,691 | A * | 2/2000 | Tavor | F16K 1/12 137/219 |
| 6,220,272 | B1 * | 4/2001 | Tavor | F16K 1/12 137/219 |
| 6,230,734 | B1 * | 5/2001 | Grebnev | F16K 1/123 137/220 |
| 6,742,539 | B2 * | 6/2004 | Lyons | F16K 1/126 137/219 |
| 7,055,542 | B2 * | 6/2006 | Delobel | F16K 1/126 137/219 |
| 7,353,837 | B2 * | 4/2008 | Biester | F16K 1/12 137/219 |
| 7,588,047 | B2 * | 9/2009 | Vogt | F02B 37/013 137/220 |
| 7,896,027 | B2 * | 3/2011 | Fahl | B60P 3/225 116/276 |
| 9,121,510 | B2 * | 9/2015 | Volovec | F16K 1/126 |
| 2013/0306172 | A1 * | 11/2013 | Volovec | F16K 1/12 137/556 |

* cited by examiner

PRESSURE INDEPENDENT CONTROL AND BALANCING VALVES

Cross-Reference to Related Applications

This application is a U.S. National Stage Filing of PCT Application No. PCT/EP2014/053539 filed on Feb. 24, 2014, and published in English as International Publication No. WO 2014/131727 A3 on Sep. 4, 2014, and claims priority of European Patent Application No. 13157343.8 filed on Feb. 28, 2013, the entirety of which are both hereby incorporated herein by reference.

The present invention relates to a device having pressure independent control and balancing valves. Control valves and balancing valves are commonly used in hydronic systems to monitor and adjust fluid flow rate and ensure a relatively steady flow of fluid.

BACKGROUND OF THE INVENTION

In fluid networks, it is common to distribute fluid from a source to one or more points of consumption (loads). In order to provide the correct amount of fluid under varying demands, one or more control valves are commonly provided. These control valves respond to a control signal to create variable restrictions in the system providing an appropriate amount of fluid to each load. For example, a control signal might be supplied by a thermostat, and a control valve might respond by changing the flow of heating or cooling fluid through a heat exchanger. If the control valve is chosen with a maximum opening that is larger than the maximum needed for the application, then it must be controlled to close excessively at all times. This excessive closure results in unstable control as the control valve changes from an open condition to a closed condition repeatedly rather than settling at the proper location. Conversely, if the valve is chosen with too small a maximum opening, excessive pumping energy is required to address unnecessary pressure drops arising in the system. This problem is compounded by the fact that control valves are ordinarily available only in fixed steps, forcing the user to select one or another type of error.

The known systems generally have differing amounts of surplus pressure at different terminals. An ordinary control valve provides no means for reading the flow rate of the fluid, nor of manually adjusting its maximum opening which will cause an ordinary control valve to incorrectly control the flow of fluid. While the amount of surplus pressure might be calculated in theory, in practice the calculations are often not done due to their complexity, or are inaccurate due to construction variations. This problem is frequently addressed by installing balancing valves, which provide a calibrated adjustable restriction and a means of measuring the flow rate. A balancing contractor is then employed to adjust these balancing valves throughout the system so that at maximum flow conditions all terminals receive the correct flow of fluid without excess. Further, in some systems the pressure at each terminal can change as the loading on the system causes the system resistance to change and as the pumping power is altered to correspond to changing loads. The result can be that under different load conditions, the system uses more power than necessary, or some terminals do not get the amount of fluid they need, or the operation of some terminals is unstable. To correct this, pressure controllers are sometimes incorporated either as separate components or integrated with a control valve.

The known valves suffer from the problem that the restriction created by the balancing valve is not taken into account by the control valve, so that a portion of the control valve's stroke is wasted.

Some prior devices combine the function of a control valve and a balancing valve in a single unit, providing improved performance of the combined unit. With the control function and balancing accomplished by a single device, it is possible to provide improved control performance tailored to the exact conditions experienced at a given terminal.

Some prior devices combine a control valve in the same housing with a pressure compensator to make a pressure independent control valve. These devices in some cases also include an adjustment for their maximum flow.

A problem suffered by some prior art devices is that they are bulky, especially in large sizes.

A further problem suffered by prior art devices is that they do not have the correct relationship between their stem position and the heat transfer of the connected device, particularly when they are adjusted to a particular maximum flow.

The present invention seeks to provide a device which addresses one or more of the problems presented by prior art arrangements.

SUMMARY OF THE INVENTION

The present device uses an axial layout wherein a control valve plug extends from a body embedded within the flow of fluid through the device, and a regulator piston closes against the opposite end of that same embedded body. Remarkably, this produces a compact device with additional technical advantages as will be detailed below.

Thus, in a first aspect, the invention provides a device having pressure independent control and balancing valves, suitable for use in a hydronic system, the device comprising a seat, a plug having an upstream surface and a downstream surface, and a piston, wherein the seat, plug and piston are aligned coaxially, an adjustment means determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction.

Preferably, the plug is generally cylindrical and it is capable of moving axially relative to the seat. Control of fluid flow rate is achieved by varying the distance between the plug and the seat.

Preferably, the downstream surface of the plug is generally conical and extends into a tube defined by the piston.

Preferably, the piston is generally tubular and has a telescopic portion which at least partially encompasses the downstream surface of the plug. Preferably, the piston is capable of making annular contact with the plug distal to the central longitudinal axis of the plug.

Preferably, fluid is capable of flowing through the device and the plug is located within the flow path of the fluid, the plug arranged with its longitudinal axis parallel to the flow direction. Preferably, the fluid flow path extends radially outward between the plug and the seat, and extends radially inward between the downstream surface of the plug and the telescopic tubular portion of the piston.

Preferably, the piston has a flange having a low pressure side and a high pressure side, the low pressure side of the flange in use being subjected to fluid pressure downstream of the first restriction (P2) thereby producing a force urging the piston to increase the size of the second restriction, the high pressure side of the flange in use being subjected to fluid pressure upstream of the first restriction (P1) thereby producing a force which urges the piston to reduce size of the second restriction, and a spring urging the piston to increase the size of the second restriction.

Preferably, the tubular portion of the piston has a transition of diameter both inside and outside, such that the radial area of the piston which is subject to P2 is equal to the radial area of the piston which is subjected to P1.

Furthermore, preferably in use the radial area of the piston subject to the fluid pressure downstream from the second restriction (P3) is equal for the side which would urge the piston toward an open position inside which would urge the piston toward a closed position. This provides the advantage that a device of the invention is less sensitive to changes in fluid pressure that may occur between fluid pressure in fluid after the second restriction compared to the fluid pressure in fluid before the first restriction. This in turn allows the regulator to function despite a wide range of system pressure differentials. In other words, according to the invention, the piston operates axially through a wide range of imposed fluid pressures from the system.

It will be appreciated that one of the most important functions of a regulator is to provide the same flow rate under a wide range of imposed pressure conditions. However, a common failure of known regulators is that they suffer from sag. Sag is a phenomenon which occurs when increasing the system differential pressure between P1 and P3 that causes the controlled differential pressure between P1 and P2 to decrease. This in turn causes the fluid flow rate to decrease with increases in P1 minus P3. Such a condition creates instability since decreasing the flow rate causes an increase to the pressure differential but only temporarily during deceleration of the fluid. Some devices attempt to address sag by being arranged so that they close against P1 instead of against P3. However, although this prevents the relatively dangerous effects of sag, it still causes the regulator to change flow with changes in the differential between P1 and P3. Advantageously, a device according to the invention is almost completely unaffected by changes to the differential between P1 and P3.

In an embodiment, the piston and the downstream surface of the plug comprise a regulating section which is located downstream of a control section comprised by the upstream surface of the plug and the seat. The piston moves upstream to close the fluid path in the regulating section, wherein it closes against a control mechanism formed by the downstream surface of the plug, and is operated by the pressure difference in fluid flowing through the device created by the control restriction formed by a gap between the upstream surface of the plug and the seat. The piston comprises a tubular portion and movement of the piston creates a regulating restriction in the fluid path downstream of a controlling restriction in the fluid path created by movement of the plug.

In an embodiment, the piston comprises a tubular portion having a section of reduced outer diameter adjacent the upstream end of the piston. In addition, adjacent to the section having a reduced outer diameter and downstream therefrom, the tubular portion of the piston has a section of reduced inner diameter. The reduced outer diameter is substantially equal to the reduced inner diameter.

Advantageously, according to the invention, the plug, together with its downstream surface formed by its associated mechanism housing, forms substantially the only obstruction in the flow path. The preferred embodiment includes a Lamer Johnson type valve. In other words, the control plug telescopes from a body formed by the mechanism housing that's embedded in the flow of the fluid. In the case of this valve, the differential pressure section comprising the piston has been arranged so that the piston closes the flow path against that same body from which the control plug telescopes, but on its other end. This has the advantages of simplifying construction, reducing fluid pressure drops in use, and reduces the overall size of the device.

Furthermore, in accordance with the invention, at least one seal that would be required in prior art devices is now unnecessary. Instead, the invention merely requires a scraper or guide. It also means that a jog could be used to offset P3, because the same fluid pressure that is present at the surface of the piston is also present at the jog.

A problem that can occur with valves having the axial layout of the invention is that relatively large vortices can be generated downstream in the fluid flowing through the devices. These vortices are often referred to as "wake" which exists downstream of the control mechanism and the regulation restriction. The vortices give rise to cavitation in the fluid and this can cause vibration. Vibration can adversely affect performance of the device.

Thus, in a second aspect, the invention provides a device having pressure independent control and balancing valves, suitable for use in a hydronic system, the device comprising a seat, a plug having an upstream surface and a downstream surface, and a piston, a controller determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction; wherein the downstream surface of the plug is defined by one or more cavitation suppressing elements.

Preferably, the cavitation suppressing elements comprise a plurality of ridges.

In one embodiment, the cavitation suppressing elements are formed by a plurality of cylindrical members.

In an alternative embodiment, the cavitation suppressing elements are formed by a plurality of frusto conical members.

Preferably, the members abut each other to form a plurality of steps. Preferably the steps are annular and they have an axial height and a radial width between radially proximal inner and radially distal outer edges.

Preferably, the radial distance between adjacent members is small distal to a central axis of the plug and the radial distance between adjacent members is large proximal to the central axis of the plug. Preferably, there is a gradual transition.

Preferably, the axial height of adjacent members is small distal to a central axis of the plug and the axial height of adjacent members is large proximal to the central axis of the plug. Preferably, there is a gradual transition.

In other words, preferably, the cavitation suppressing elements are progressively larger in height and width with the distance from the point of contact between the piston and the plug, the cavitation suppressing elements forming a stepped, approximately conical surface.

In a preferred embodiment, a line in a plane including a central axis of the plug joining the outer edges of the cavitation suppressing elements meets the central axis of the plug at about 45 degrees to about 50 degrees, more preferably about 47 degrees.

In a preferred embodiment, the cavitation suppressing elements are formed by 12 cylindrical members. Preferably, the axially largest cylindrical member is located adjacent a central axis of the plug and it has a width of 6.5 mm between the radially proximal inner and radially distal outer edges of the member. Preferably, the axial height of this cylindrical member is 6.5 mm. Preferably, successive radially distal cylindrical members have a width and height of 0.5 mm less than proximal adjacent member. Preferably, the smallest step is 1 mm tall and is located approximately 3 mm from the point of contact between the piston edge and the plug.

Remarkably, the cavitation suppressing elements (sometimes called "steps") provide the advantage that they assist with reducing the "wake" after the control mechanism and downstream of the plug. This benefit has been determined by experimentation and, without wishing to be bound by theory, is believed to work by creating a series of small vortices to prevent formation of a larger vortex. In other words, the vortices shed by the series of steps are believed to help prevent detachment of the boundary layer from the regulator plug.

In a third aspect, the invention provides a device having pressure independent control and balancing valves, suitable for use in a hydronic system, the device comprising housing having a seat, a plug having an upstream surface and a downstream surface, and a piston, a controller determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction; wherein operation of the piston can be prevented by closing a channel through the housing subject to differential pressure across the first restriction.

Preferably, the channel extends through the housing from upstream of the seat and is in fluid communication with a driving surface of the piston.

Preferably, a valve in the channel is provided to enable the channel to be opened or closed.

Preferably, the channel can be switched using the valve and provides that either the driving side of the piston is in fluid communication with the fluid pressure upstream of the first restriction when the valve is in a first position, or the driving side of the piston is in fluid communication with the fluid pressure between the first and second restrictions when the valve is in a second position.

This provides the advantage that the channel which connects P1 to the driving side of the piston used for regulation can be switched such that instead P2 is provided thereby preventing operation of the piston.

Commonly when piping networks are built, there is debris in the pipes. In order to remove this debris it needs to be moved to a strainer. This is done through a process called flushing, in which the velocity in the pipework is increased possibly to four times its normal value. Flushing may also be carried out after several years of operation to remove debris created by corrosion or similar processes. If the regulating function is operational during flushing, then fluid in the circuit will not flow more than its ordinary design flow. This feature provides the advantage of allowing the device to be flushed at high fluid velocities without the regulating function interfering.

Some prior devices are known to have the ability to deactivate the pressure regulator by employing a restricted passage to P1 and by opening a passage to P2. In contrast, in accordance with the invention, preferably a passage to P1 is closed and simultaneously a passage to P2 is opened. Opening a passage to from the driving side of the piston to P2 when the passage to P1 is closed further ensures that the piston will be driven to its fully open position by the spring. By closing the passage to P1, flow of fluid through the channel during flushing is avoided. This is advantageous because during flushing the fluid in the pipeline is likely to be more contaminated than normal, since the very purpose of flushing is to get sediment from the pipes entrained into the flow stream.

In a fourth aspect, the invention provides a device having pressure independent control and balancing valves, suitable for use in a hydronic system, the device comprising housing having a seat, a plug having an upstream surface and a downstream surface, and a piston, a controller determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction; wherein the upstream surface of the plug is defined by a tube and a disk positioned inside the tube, and the end of the tube is radiused such that the edge which cooperates with the seat to form the control restriction has the form of a half-torus.

Preferably, the thickness of the tube is 1.6 mm and the radius of its edge is 0.8 mm so that the tube ends with a half-torus.

Preferably, the disk is located about 6 mm inside the end of the tube.

Preferably, the thickness of the tube downstream from the disk is chosen so that it represents approximately 1/16th of the entire surface of the plug, and the wall of the tube downstream from the disk is exposed to fluid pressure in use downstream of the control restriction.

Preferably, the disk defines at least one holes so that in use, it is exposed to the same pressure on both sides.

Preferably, the disk defines a plurality of holes.

In preferred embodiments the plug and seat are enclosed by a chamber, an adjustment means for adjusting the separation of the plug and the seat, and monitoring means for monitoring the rate of fluid flow across the separation, are provided wherein the adjustment means comprises a motion transformation means operable by an actuator to restrict the motion of the valve plug, whereby to provide a favourable change in conductance of the valve for a given change in the actuator position and wherein the actuator is calibrated in increments which correspond to incremental changes in the conductance, and a piston having a tubular portion which cooperates with the opposite end of the plug to form a second restriction said second restriction being responsive to differential pressure across the first restriction and being operable to maintain a constant value approximately for the differential pressure across the first restriction.

Advantageously, the adjustment means is used for setting the desired flow rate and the balancing of circuits is accomplished by the differential pressure regulator as well as by setting the adjustment means.

In preferred embodiments, a calibration means conveniently emerges from the chamber in the form of a rack having a linear scale presented along its length and linear movement of the rack is translated to one or both of the valve seat and plug whereby to adjust the separation of the seat and plug by an amount which corresponds to the distance travelled by the rack according to the linear scale.

In an option, the rack is surrounded by a threaded sleeve operable to limit its travel, which engages with a complementary thread fixed relative to the chamber and linear movement is effected by rotating the sleeve. Optionally, the sleeve could be prevented from rotating, and it could engage against a nut which is translationally fixed with respect to the housing. In either option, a scale may be provided about the circumference of the rotating element whether in addition to the aforementioned linear scale (for example to allow fine adjustment) or as the only scale.

Desirably the plug and seat are arranged in axial alignment with the intended direction of flow of fluid in the system. In an axial geometry, fluid flows into and out of the valve along a single axis, and the plug moves along that same axis. The piston which is operable for regulation also moves along the same axis. The fluid flows radially outward through the restriction between the plug in it seat, and then radially inward between the regulator piston and the backside of the plug. At the end of the second restriction, the fluid has returned to approximately the same diameter passage as the inlet. Thus, the central axis of the valve is aligned with the central axis of the plug. This geometry provides reduced turbulence and consequently less noise than geometries which require the fluid to change direction excessively. This geometry also provides the advantage that it allows the valve to be more compact than other geometries.

In one preferred embodiment, the calibrated rack extends into the chamber to include a toothed portion, this engages with a pinion which in turn is fixed to a cam plate of a cam mechanism which cam plate rotates with the pinion to effect movement of a cam follower, the cam mechanism being operable to adjust the separation of the plug and seat. The cam follower is conveniently fixed to a shaft to which in turn is fixedly mounted the seat or plug. As the cam follower follows the guide provided in the cam plate, axial movement of the shaft occurs thereby adjusting the separation of the plug and seat.

The geometry of the cam is selected to translate constant motion from an actuator into a favourable motion of the plug, thereby providing a favourable change in the fluid conductance of the valve in response to a control signal. For example, the cam might be so designed that the valve opening compensates for the output characteristic of a heat transfer device, thereby creating a more nearly linear relation between the control signal and the heat transfer. Such a linear relationship between the control signal and the desired controlled variable is sometimes referred to as a constant gain and is advantageous to control systems. The cam motion may also provide a mechanical advantage to an actuator in moving the plug as it nears its closed position, thereby reducing power needed to drive the actuator.

Preferably the plug and seat are configured to provide a fluid conductance which is approximately proportional to the movement of the plug.

Optionally, axial movement of the shaft is resisted by a biasing spring which might be arranged either to bias the valve in an open position or a closed position. Desirably, the biasing spring urges the valve to open, this assists in preventing oscillations.

It is common in control valves involving linear motion of the plug for the pressure of the system to urge the valve to an open position as a result of the pressure differential between the interior of the valve and the exterior location where the actuator is placed. Therefore in an optional improvement on the already described invention, this problem is addressed by providing two shafts of equal diameters arranged for simultaneous axial movement in opposing directions between the two areas of different pressure.

As already stated, in some embodiments, one or more springs may be provided to create a biasing force, such that the valve is either always urged toward an open position or always urged towards a closed position. In such cases the balancing of the differential pressure may additionally be configured to provide a "biasing force" in the same direction.

BRIEF DESCRIPTION OF THE DRAWINGS

The invention will now be further described with reference to the accompanying drawings in which.

DETAILED DESCRIPTION OF THE INVENTION

It will be appreciated that aspects, embodiments and preferred features of the invention have been described herein in a way that allows the specification to be written in a clear and concise way. However, unless circumstances clearly dictate otherwise, aspects, embodiments and preferred features can be variously combined or separated in accordance with the invention. Thus, preferably, the invention provides a device having features of a combination of two or more, three or more, or four or more of the aspects described herein. In a preferred embodiment, a device in accordance with the invention comprises all aspects of the invention.

Within the context of this specification, the word "about" means plus or minus 20%, more preferably plus or minus 10%, even more preferably plus or minus 5%, most preferably plus or minus 2%.

Within the context of this specification, the word "comprises" means "includes, among other things" and should not be construed to mean "consists of only".

Within the context of this specification, the word "substantially" means preferably at least 90%, more preferably 95%, even more preferably 98%, most preferably 99%.

Figure 6:
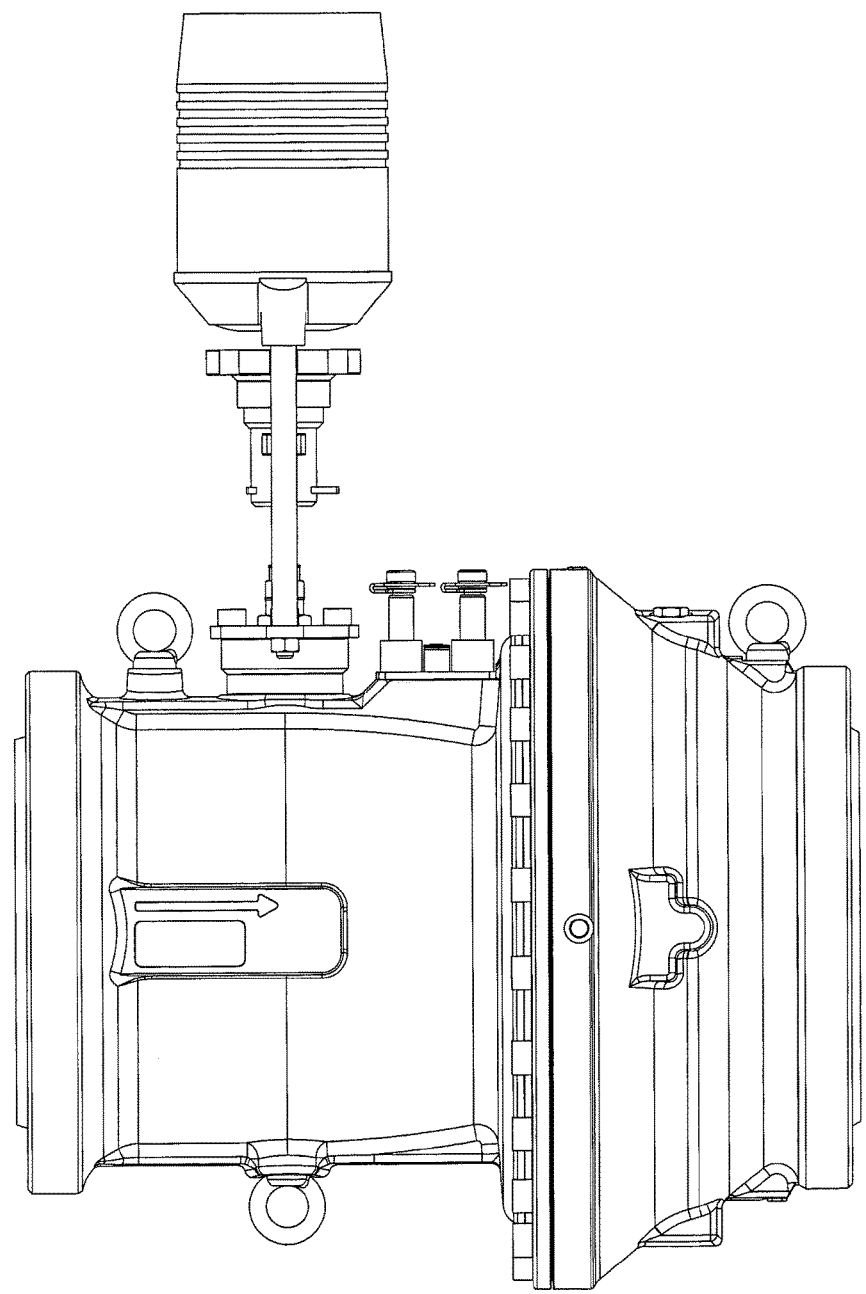
FIG. 6 shows an outside view of the present invention with an electro-mechanical actuator attached.

A valve in accordance with the invention is shown externally in FIG. 6. It can be seen in FIG. 2 that this valve comprises a main housing (22) which encloses a chamber in which is located a plug (19) which telescopes from a control mechanism housing (31) which is joined with the main housing through a series of ribs. The plug (19) is operable in conjunction with the seat (15) and plate (21) to create a first restriction (36), the seat being held in place between valve cover (20) and plate (21). The size of this first restriction (36) in turn is controlled by the position of the rack (23) and thereby can be adjusted either through a limiting mechanism or the motion of an attached actuator.

Figure 1:
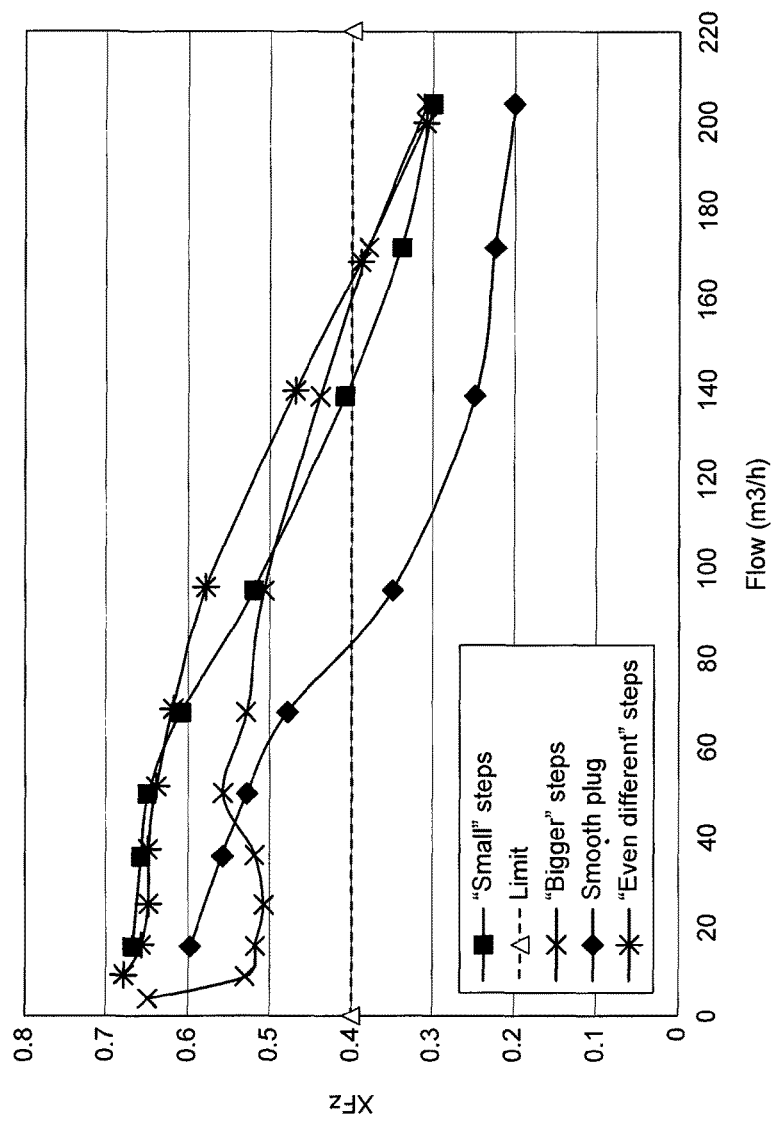
FIG. 1 shows a comparison between an embodiment of the present invention referred to as "Even different" steps to a smooth plug, large steps, and small steps. In the comparison, the x axis shows the flow rate of water through the valve, while the Y axis shows XFz, the critical pressure ratio at which cavitation starts. Higher values for XFz are better. As can be seen clearly in the graph, a set of small ridges ("small steps") improved the cavitation performance considerably compared to a smooth surface. This is believed to be because the eddies created by the ridges help keep the boundary layer attached to the surface as described in fluid dynamic texts for golf balls and similar cases. Boundary layer separation would create larger eddies with lower pressure at their center, thus more cavitation. To be effective the ridges have to be placed at a favorable angle. For one particular embodiment, that angle was determined to be 47 degrees.
Figure 2:
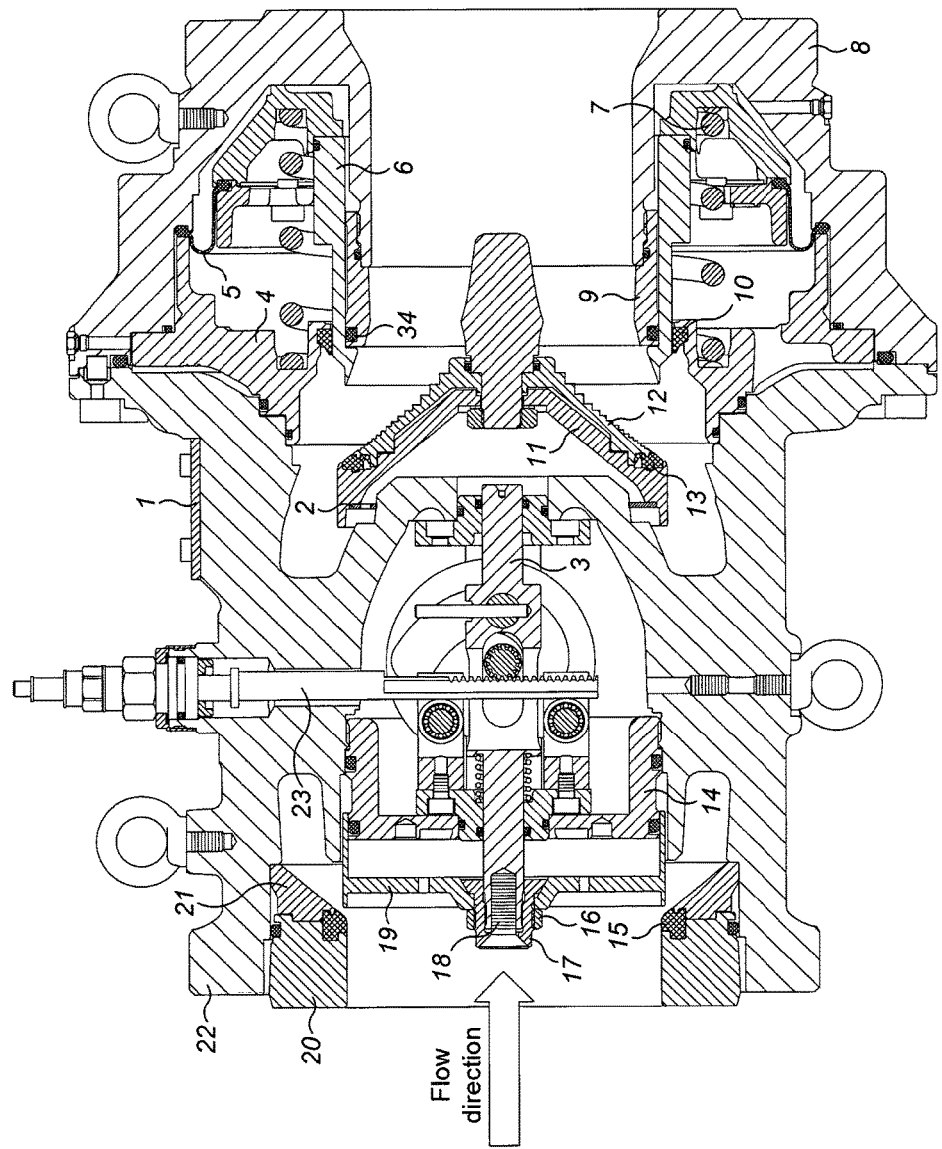
FIG. 2 shows a side view of a valve in accordance with the invention in cut away view.
Figure 3:
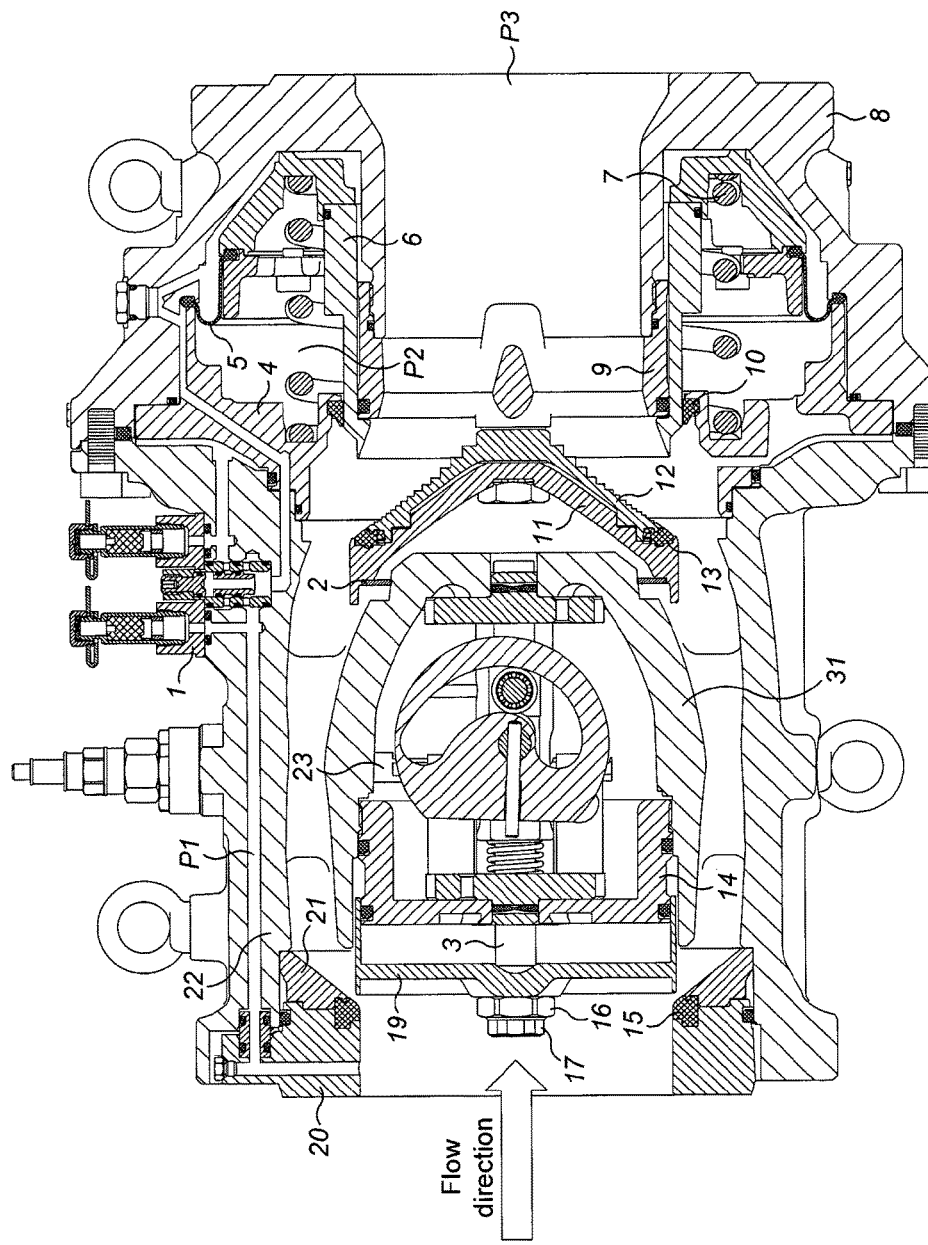
FIG. 3 shows a side view of an alternative embodiment of a valve in accordance with the invention.

It can be seen in FIG. 2 that plug (19) defines a plurality of holes. These holes allow the pressure in fluid upstream of the plug to be communicated into a chamber formed between the upstream surface of the plug and its mechanism cover (14). The plug (19) is connected to the shaft (3) by a calibrator (17), a screw(18), and a fixing nut (16) these latter three components allow relative adjustment between the shaft and the piston, this adjustment making it possible for the maximum opening of the control mechanism to be very accurate. A piston (6) cooperates with a regulator seat (13) and a differential plug (12) to create a second restriction (35). In the case of the embodiment shown the piston (6) is actually made up of three different pieces joined together by a plurality of screws and sealed with suitable means at the joints, but it should be understood that the piston (6) is in essence a single body. The piston (6) includes a tubular portion which closes against the downstream surface of the plug at a regulator seat (13) and a flange portion which is exposed to two different pressures (P1 and P2).

The plug (19) has an upstream surface defined by a tube and a disk positioned inside the tube. The end of the tube is radiused such that the edge which cooperates with the seat (15) to form the control restriction (36) has the form of a half-torus.

The thickness of the tube is 1.6 mm and the radius of its edge is 0.8 mm so that the tube ends with a half-torus.

Figure 10:
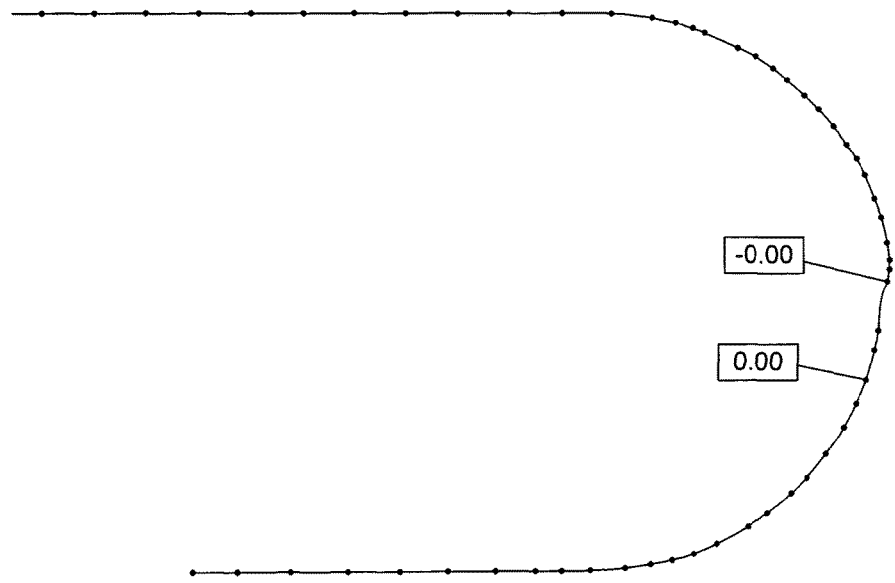
FIG. 10 shows a detail from a successful inspection of the end of the control plug, along with the graphs showing that when the end of the control plug is properly formed the flow rate does not change the resistance between the control plug and the seat.
Figure 10:
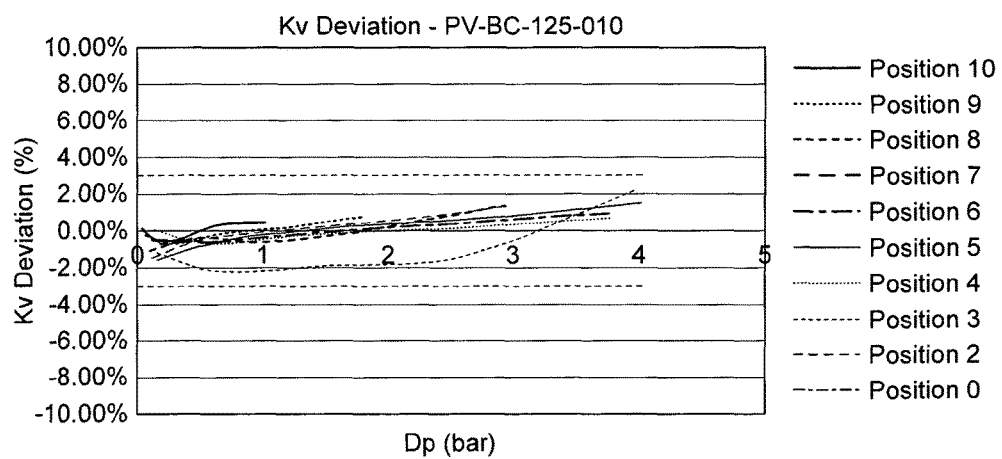
Figure 11:
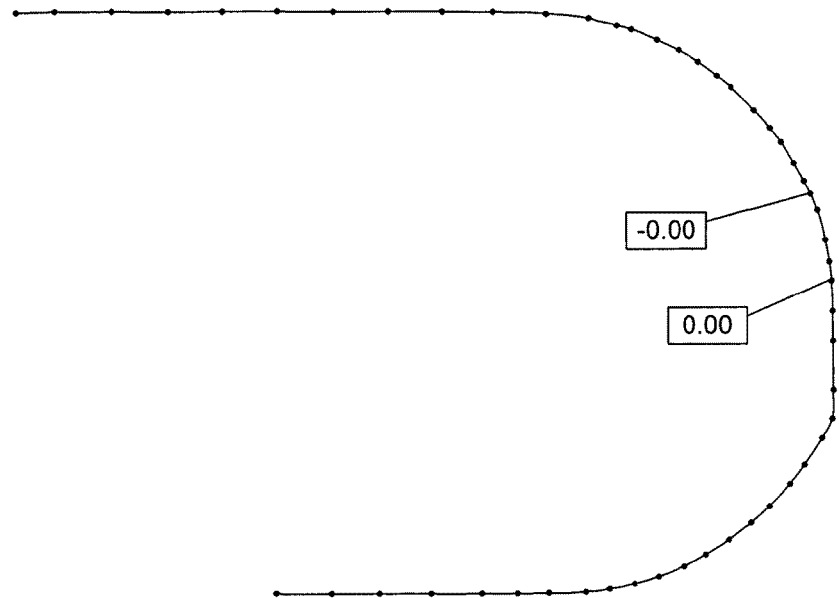
FIG. 11 shows an inspection of the edge at the end of the plug when is it is incorrectly formed, along with the graph that shows variations in the resistance between the plug and seat when the flow rate changes.
Figure 11:
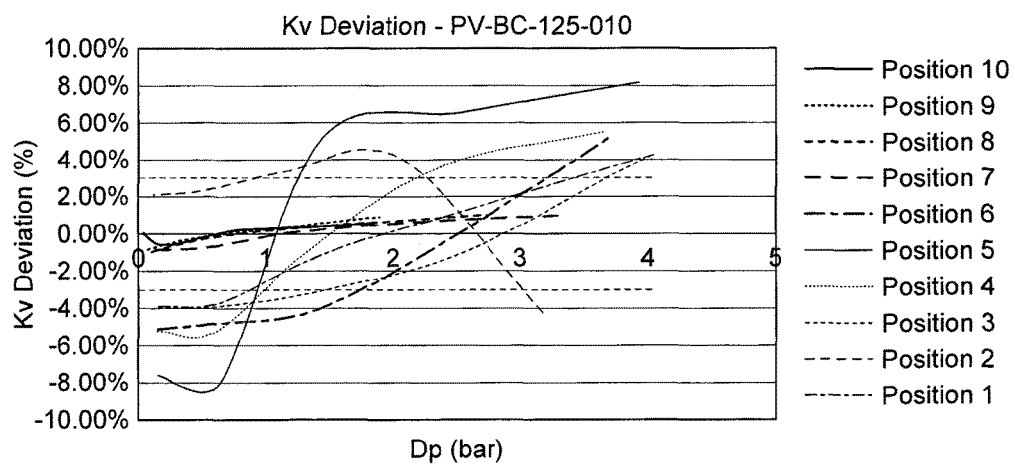
Figure 12:
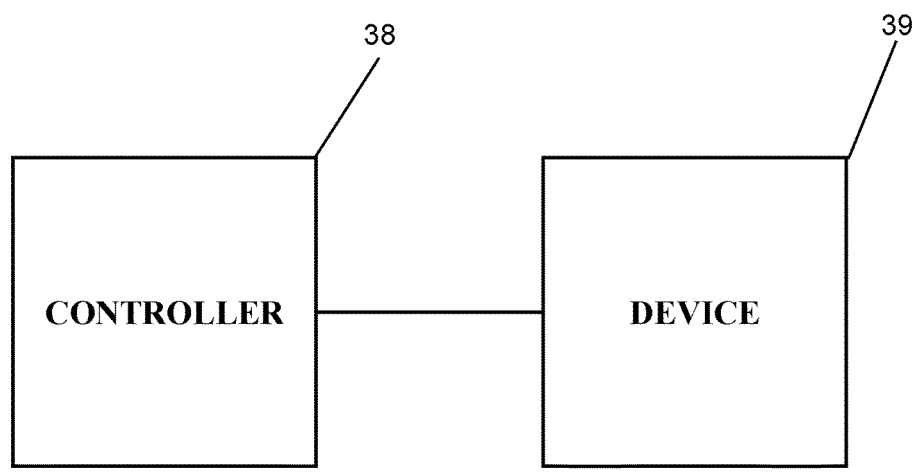
FIG. 12 is a simplified block diagram showing one example of a device and controller therefor of the present invention.

FIGS. 10 and 11 show the results of a study on the shape of the end of the tube. Remarkably, from the results shown it is clear that a half-torus profile at the end of the tube is important.

The disk is located about 6 mm inside the end of the tube.

The thickness of the tube downstream from the disk is chosen so that it represents approximately 1/16th of the entire surface of the plug, and the wall of the tube downstream from the disk is exposed to fluid pressure in use downstream of the control restriction.

The disk defines a plurality of holes so that in use, it is exposed to the same pressure on both sides.

A spring (7) urges the piston (6) toward an open position wherein the second restriction (35) is maximised, while the fluid pressure on the driving side (32) of the piston (6) urges it toward a closed position wherein the second restriction (35) is minimised. A diaphragm (5) and a drive chamber o-ring (34) seal the fluid pressure from the driving side (32) of the piston (6) against the pressure in a spring chamber (33).

Figure 8:
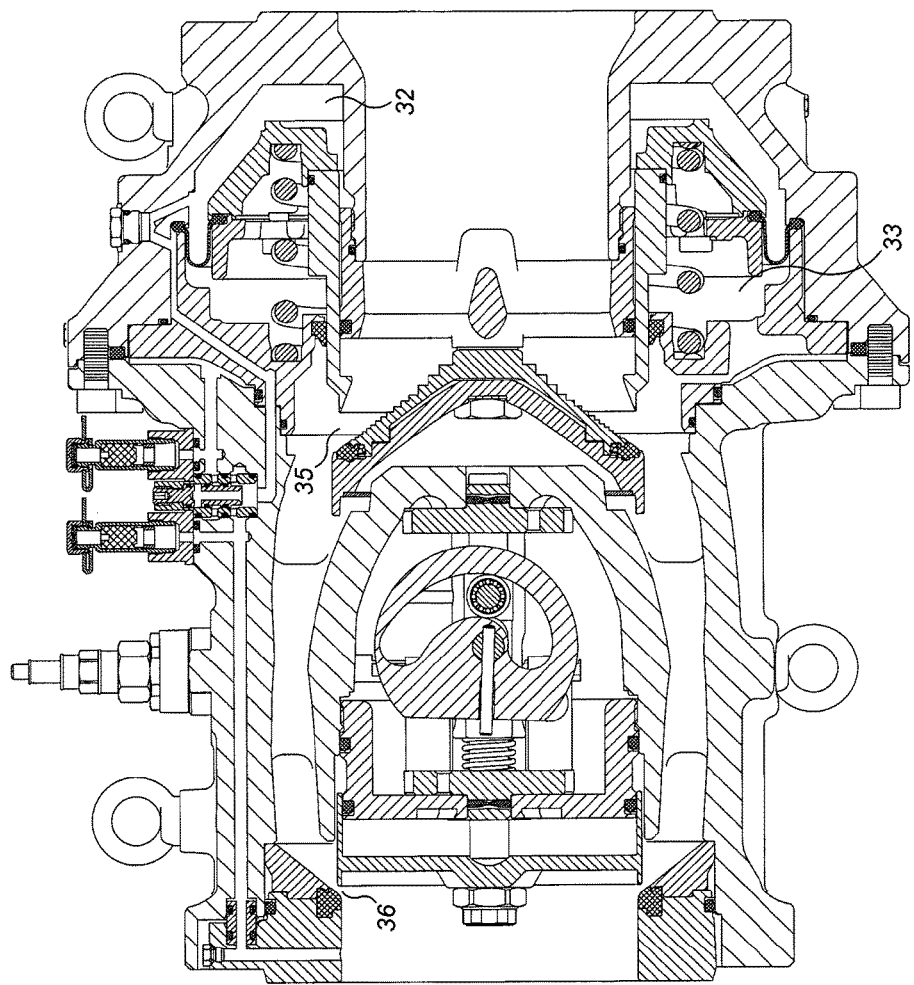
FIG. 8 is a cross-section of the device taken in a plane which exposes the pressure communication between spring chamber 33 and P2, with the regulator piston and the control plug both partially closed. This allows clear visibility when taken with the other figures of the construction of the piston and the flow of fluid vital to regulation.

Referring to FIG. 8, the driving side (32) of the regulator piston (6) can be seen in detail. In FIG. 8, it can be seen that the chamber (32) is in fluid communication with the centre of the differential pressure (DP) switcher (25) which is shown in detail in FIG. 4. In the position shown in FIG. 8 the DP switcher (25) connects the driving side of the regulator piston (32) to a channel which connects in turn to the fluid pressure (P1) upstream of the control valve plug (19).

Figure 9:
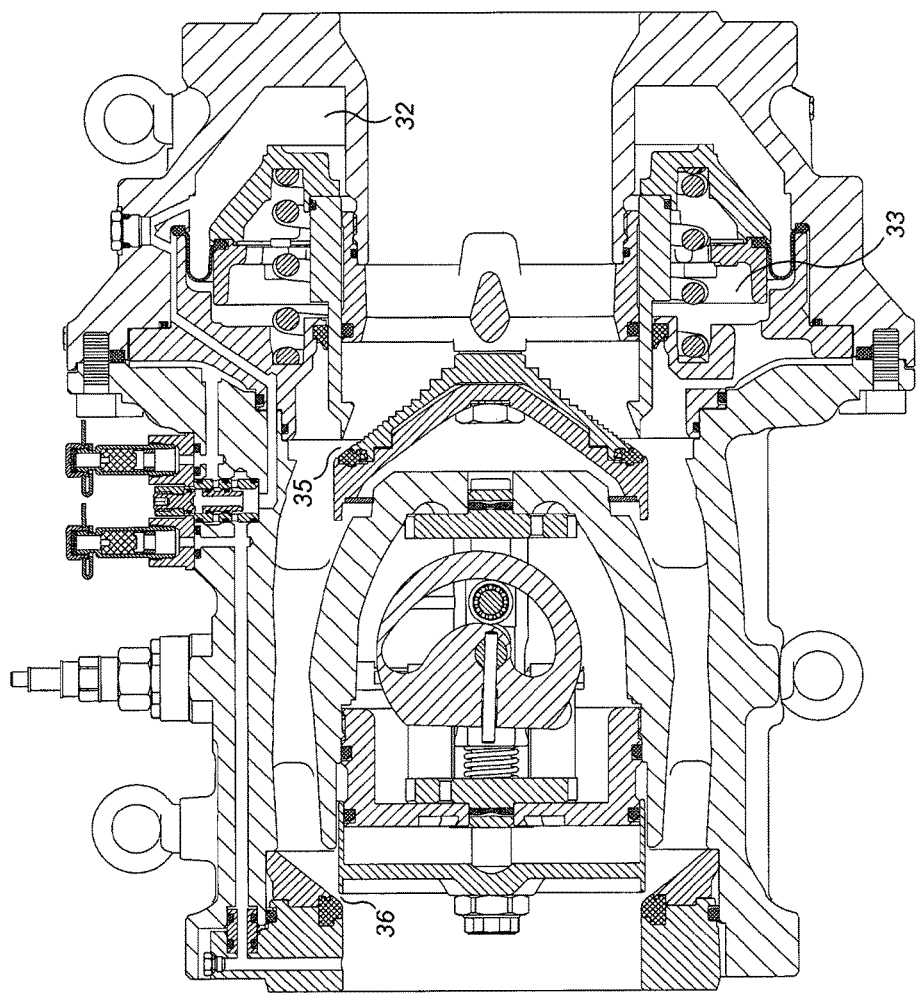
FIG. 9 is like FIG. 8, but in a more closed position for both the piston and the plug.

It can also be seen in FIGS. 8 and 9 that the spring chamber (33) and consequently the downside of the piston (6) is in fluid communication with the pressure just before the second restriction (35). This pressure is substantially the same as pressure just after the control restriction (36). This intermediate pressure between the first and second restrictions (36 and 35), formed between the plug (19) and its seat (15), and the piston (6) and its seat (13) respectively, is referred to in this specification as P2. The scraper (10) shown in FIG. 2 helps to prevent debris from entering into the spring chamber (33) as the piston (6) moves back and forth.

Figure 4:
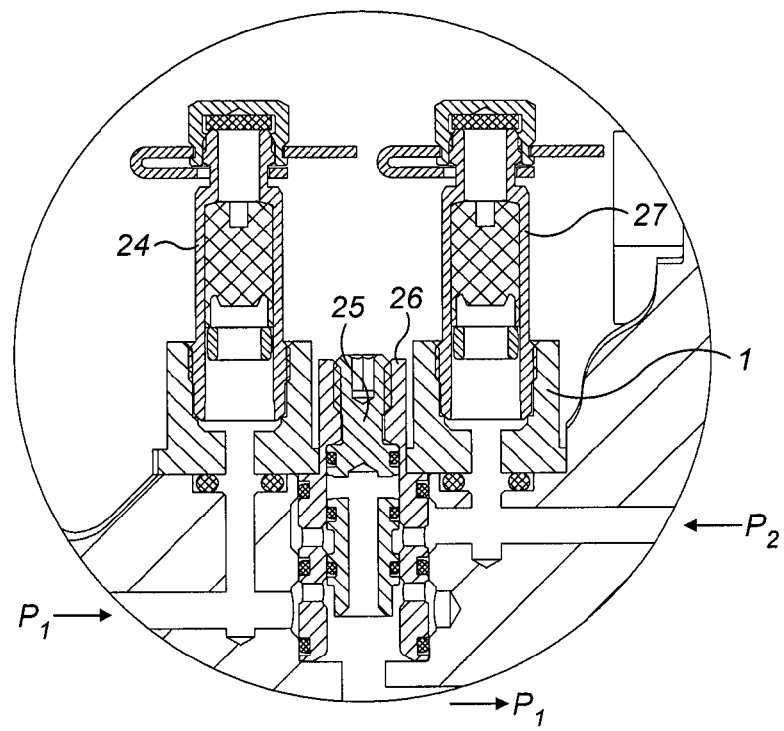
FIG. 4 shows cross-sections of the pressure switching mechanism, shown in the position which transmits P1 to the driving side of the piston; and in the position which transmits P2 to the driving side of the piston.
Figure 4:
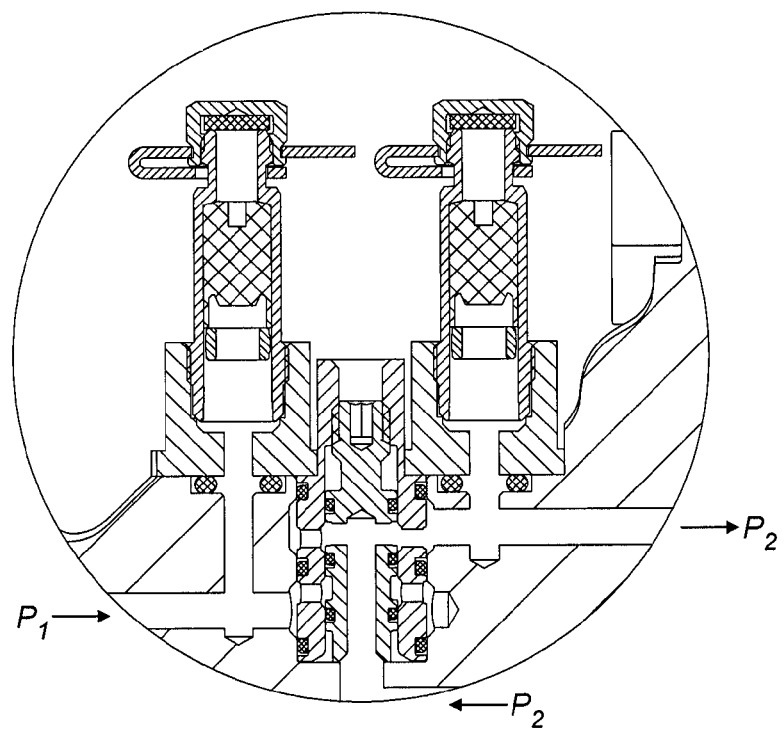

In FIG. 4 we see detailed views in cross-section of the DP switcher (25) and the DP switcher body (26) as well as the higher DP pressure test point (24) and the lower DP pressure test point (27). As previously mentioned the central passage through the DP switcher (25) is connected to the driving side (32) of the regulator piston (6). As can be seen in FIG. 4 in the position of the DP switcher (25) the central passage is connected to the same passage has the higher pressure test point (24). This therefore is the active condition in which the regulating mechanism will maintain an essentially constant differential pressure across the first restriction (36). The DP switcher body (26) is the same components as can be seen as the main DP switcher body (1) in other views.

Figure 5:
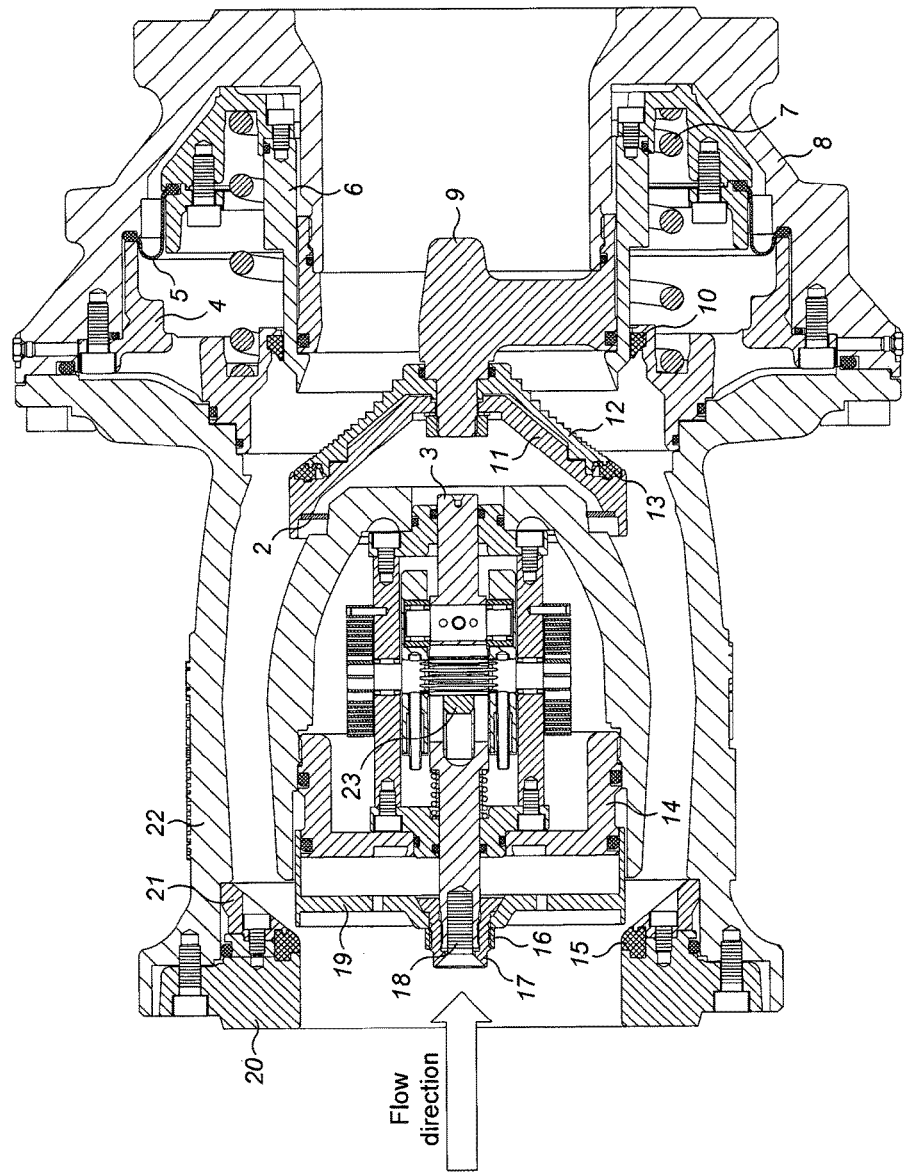
FIG. 5 shows a cross-section of the device in a different plane, showing details of the connection between the regulating mechanism and the control plug housing.

FIG. 5 shows a cross-section of the device of the invention in a different plane. In this view it is easy to see that piston guide (9) connects the rear portion of the housing to the differential pressure sealing plate holder (11), and the differential plug (12), with the regulator seat (13) being captured between the differential plug (12) and the differential sealing plate holder (11). An anti-vibration washer (2) fits between the differential sealing plate holder (11) and the control mechanism housing (31) and is provided with a plurality of holes that allow fluid pressure to be communicated to the backend of the main valve axis (3).

Figure 7:
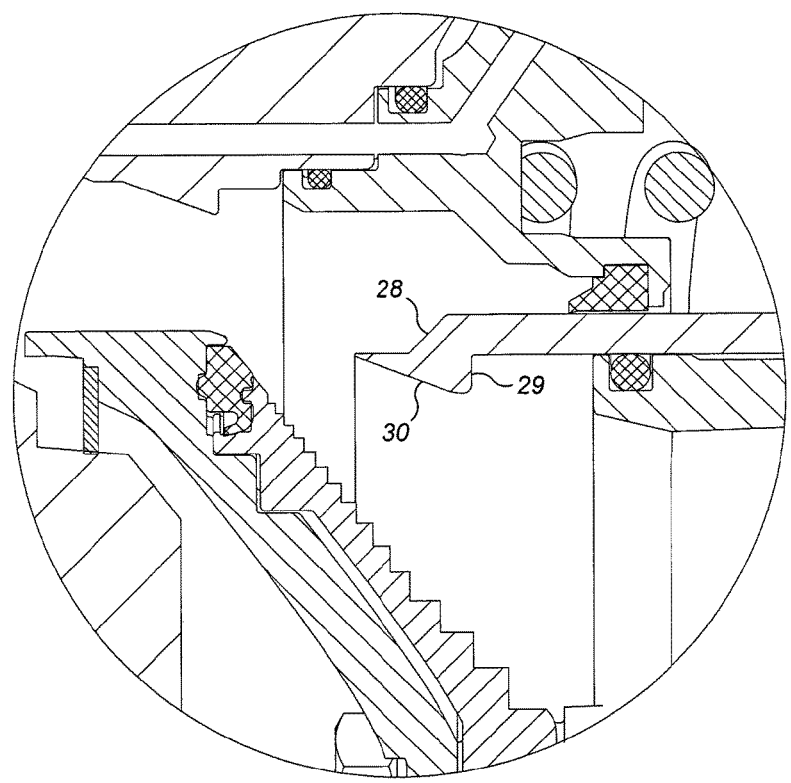
FIG. 7 shows a detail from the end of the regulator piston, with the piston in a partially extended position so that the "jog" used to mitigate the effect of P3 is visible.

In FIG. 7 we can see a detailed view and cross-section which shows the end of the tubular portion of the piston (6). This end of the piston engages with the regulator seat (13) to provide a second restriction (35) in the fluid flow path also referred to as a regulating restriction (35). An upstream surface (28) of the piston (6) is defined by an outside diameter (OD) step (28). It is acted on entirely by P2 and completes the projected area to match the area exposed to P1. It can be seen that a downstream surface (30) of piston (6) defined by an internal diameter (ID) chamfer (30) is downstream from the regulating restriction and it can also be seen that the radial extent of downstream surface (30) is equal to the radial extent of second downstream surface (29) defined by an internal diameter (ID) step (29) which is also downstream from the same regulating restriction (35). In this way the fluid pressure downstream from the second restriction (35) also referred to as the regulating restriction (35) has very little influence on the motion of the piston.

A calibration means is provided in the form of an assembly which interacts with a rack (23) which passes through a sealed inlet chamber which is free to slide axially by means of a bearing mounted in the inlet. The rack (23) is adapted to connect to an electromechanical or other controlled drive means.

The rack (23) extends into the chamber in a direction perpendicular to the motion of the plug and parallel with the face of the plug (19) and has a toothed portion. The toothed portion engages with a pinion gear which is fixedly mounted by means of pin to a cam plate which incorporates a guide for a cam follower. The cam follower is fixedly mounted on the shaft and the pinion gear passes through a slot in the shaft so as not to obstruct its axial movement. As the rod moves axially, the pinion gear, through its engagement with the teeth of rack is forced to rotate and the cam plate rotates with it. As the cam plate rotates, the cam follower is forced to travel in the cam guide carrying with it the shaft. Movement of the shaft in any direction other than axially is prevented by the housing, engagement of the pinion gear in the slot of the shaft and other components. The plug (19), carried on the shaft is also forced to move axially thereby adjusting the separation of the plug (19) and seat (15). The distance over which the plug is caused to travel is measured by a scale provided on the area of the rod which emerges from the chamber. A distance travelled by the rod along the scale corresponds to a pre calculated travel distance for the plug (19). The shaft is assisted to move smoothly by rack bearings which hold the rack portion against the pinion without impeding its linear motion.

Encircling the shaft is a spring. The spring is compressed so as to urge the plug (19) and seat (15) to separate.

A chamber is formed between the plug (19) and cover plate (14) which is connected by a series of passages to strategically located points upstream of the plug (19). The pressure in this chamber partially compensates the pressure difference across the valve to reduce the actuation force required to move the plug.

Front and rear bearing plates seal around the shaft at opposite ends separate fluid from air in the chamber. The circumference of the shaft where it passes through each of the bearing plates is equal.

With reference to FIG. 2 it can be seen that the pinion gear is mounted in a rod bearing and follower bearings assist in the smooth travel of the cam follower. By means of pin and biasing spring, the positioning of the cam plate with respect to the cam follower is biased so as to urge a return of the cam follower, and consequently resists downward strokes of the rod.

In one example, a device (39) having a pressure independent control and balancing valve suitable for use in a hydronic system is provided. The device includes a seat, a plug having an upstream surface and a downstream surface, and a piston. The device further includes a controller (38) determining the size of a first flow restriction between the upstream surface of the plug and the seat, the piston being operable to move in response to differential pressure across the first restriction and a predetermined force, the position of the piston relative to the downstream surface of the plug determining the size of a second flow restriction thereby in use maintaining a substantially constant differential pressure across the first restriction. The downstream surface of the plug is defined by one or more cavitation suppressing elements.

In another example, a device (39) having pressure independent control and balancing valve, suitable for use in a hydronic system is provided. The device includes a housing having a seat, a plug having an upstream surface and a downstream surface, and a piston. The device further includes a controller (38) determining the size of a first flow restriction between the upstream surface of the plug and the seat, the piston being operable to move in response to differential pressure across the first restriction and a predetermined force, the position of the piston relative to the downstream surface of the plug determining the size of a second flow restriction thereby in use maintaining a substantially constant differential pressure across the first restriction. Operation of the piston can be prevented by closing a channel through the housing subject to differential pressure across the first restriction. Optionally, the channel extends through the housing from upstream of the seat and is in fluid communication with a driving surface of the piston.

In yet another example, a device (39) having pressure independent control and balancing valve, suitable for use in a hydronic system is provided. The device includes a housing having a seat, a plug having an upstream surface and a downstream surface, and a piston. The device further includes a controller (38) determining the size of a first flow restriction between the upstream surface of the plug and the seat, the piston being operable to move in response to differential pressure across the first restriction and a predetermined force. The position of the piston is relative to the downstream surface of the plug determining the size of a second flow restriction thereby in use maintaining a substantially constant differential pressure across the first restriction. The upstream surface of the plug is defined by a tube and a disk positioned inside the tube, and the end of the tube is radiused such that the edge which cooperates with the seat to form the control restriction has the form of a half-torus.

The following table summarises the referenced components shown in the Figures.

| Position | Name |
|---|---|
| 1 | Main dp switcher body |
| 2 | Anti-vibration washer |
| 3 | Main valve axis |
| 4 | Diaphragm holder |
| 5 | Diaphragm |
| 6 | Piston |

| Position | Name |
|---|---|
| 7 | Spring |
| 8 | Outlet chamber |
| 9 | Piston guide |
| 10 | Scraper |
| 11 | Differential sealing plate holder |
| 12 | Differential plug |
| 13 | Regulator Seat |
| 14 | Mechanism cover |
| 15 | Control sealing plate |
| 16 | Fixing nut |
| 17 | Calibrator |
| 18 | Screw |
| 19 | Control plug |
| 20 | Valve cover |
| 21 | Plate |
| 22 | Main valve body |
| 23 | Rack |
| 24 | Higher dp pressure test point |
| 25 | Dp switcher |
| 26 | Dp switcher body |
| 27 | Lower dp pressure test point |
| 28 | Piston Tube OD Step |
| 29 | Piston Tube ID Step |
| 30 | Piston Tube ID Chamfer |
| 31 | Control Mechanism Housing |
| 32 | Piston Driving Side |
| 33 | Spring Chamber |
| 34 | Drive Chamber O-Ring |
| 35 | Second Restriction/Regulator Restriction |
| 36 | First Restriction |
| 38 | Controller |
| 39 | Device |

It will be appreciated that various modifications and changes could be made to the subject matter described herein without departing from the spirit and scope of the invention.

The invention claimed is:

1. A device having pressure independent control and balancing valve, suitable for use in a hydronic system, the device comprising a seat, a plug having an upstream surface and a downstream surface, and a piston, wherein the seat, plug and piston are aligned coaxially, an adjustment means determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction.

2. A device according to claim 1 wherein the plug is generally cylindrical and it is capable of moving axially relative to the seat and wherein control of fluid flow rate is achieved by varying the distance between the plug and the seat.

3. A device according to claim 1, wherein the downstream surface of the plug is generally conical and extends into a tube defined by the piston.

4. A device according to claim 3, wherein the piston is generally tubular and has a telescopic portion which at least partially encompasses the downstream surface of the plug.

5. A device according to claim 3, wherein the piston is capable of making annular contact with the plug distal to the central longitudinal axis of the plug.

6. A device according to claim 1, wherein fluid is capable of flowing through the device and the plug is located within the flow path of the fluid, the plug arranged with its longitudinal axis parallel to the flow direction.

7. A device according to claim 6, wherein the fluid flow path extends radially outward between the plug and the seat, and extends radially inward between the downstream surface of the plug and the telescopic tubular portion of the piston.

8. A device according to claim 1, wherein the piston has a flange having a low pressure side and a high pressure side, the low pressure side of the flange in use being subjected to fluid pressure (P2) downstream of the first restriction thereby producing a force urging the piston to increase the size of the second restriction, the high pressure side of the flange in use being subjected to fluid pressure (P1) upstream of the first restriction thereby producing a force which urges the piston to reduce size of the second restriction, and a spring urging the piston to increase the size of the second restriction.

9. A device according to claim 8, wherein the tubular portion of the piston has a transition of diameter both inside and outside, such that the radial area of the piston which is subject to P2 is equal to the radial area of the piston which is subjected to P1; and / or wherein in use the radial area of the piston subject to the fluid pressure (P3) downstream from the second restriction is equal for the side which would urge the piston toward an open position to that which would urge the piston toward a closed position.

10. A device having pressure independent control and balancing valve, suitable for use in a hydronic system, the device comprising a seat, a plug having an upstream surface and a downstream surface, and a piston, a controller determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction; wherein the downstream surface of the plug is defined by one or more cavitation suppressing elements.

11. A device according to claim 10 wherein the cavitation suppressing elements comprise a plurality of ridges; optionally wherein the cavitation suppressing elements are formed by a plurality of cylindrical members, or frusto conical members, or wherein the members abut each other to form a plurality of steps, or wherein the cavitation suppressing elements are progressively larger in height and width with the distance from the point of contact between the piston and the plug, the cavitation suppressing elements forming a stepped, approximately conical surface.

12. A device according to claim 11, wherein a line in a plane including a central axis of the plug joining the outer edges of the cavitation suppressing elements meets the central axis of the plug at about 45 degrees to about 50 degrees, optionally about 47 degrees.

13. A device according to claim 12, wherein the cavitation suppressing elements are formed by 12 cylindrical members, optionally wherein the axially largest cylindrical member is located adjacent a central axis of the plug and it has a width of 6.5 mm between the radially proximal inner and radially distal outer edges of the member, optionally wherein the axial height of this cylindrical member is 6.5 mm, optionally wherein successive radially distal cylindrical members have a width and height of 0.5 mm less than proximal adjacent member and the smallest step is 1 mm tall and is located approximately 3 mm from the point of contact between the piston edge and the plug.

14. A device having pressure independent control and balancing valve, suitable for use in a hydronic system, the device comprising housing having a seat, a plug having an upstream surface and a downstream surface, and a piston, a controller determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction; wherein operation of the piston can be prevented by closing a channel through the housing subject to differential pressure across the first restriction; optionally wherein the channel extends through the housing from upstream of the seat and is in fluid communication with a driving surface of the piston; wherein a valve in the channel is provided to enable the channel to be opened or closed, and optionally wherein the channel can be switched using the valve and provides that either the driving side of the piston is in fluid communication with the fluid pressure upstream of the first restriction when the valve is in a first position, or the driving side of the piston is in fluid communication with the fluid pressure between the first and second restrictions when the valve is in a second position.

15. A device having pressure independent control and balancing valve, suitable for use in a hydronic system, the device comprising housing having a seat, a plug having an upstream surface and a downstream surface, and a piston, a controller determines the size of a first flow restriction between the upstream surface of the plug and the seat, the piston is operable to move in response to differential pressure across the first restriction and a predetermined force, the position of the piston relative to the downstream surface of the plug determining the size of a second flow restriction thereby in use maintaining a substantially constant differential pressure across the first restriction; wherein the upstream surface of the plug is defined by a tube and a disk positioned inside the tube, and the end of the tube is radiused such that the edge which cooperates with the seat to form the control restriction has the form of a half-torus.

16. A device according to claim 15 wherein the thickness of the tube is 1.6 mm and the radius of its edge is 0.8 mm so that the tube ends with a half-torus; and / or the disk is located about 6 mm inside the end of the tube.

17. A device according to claim 16, wherein the thickness of the tube downstream from the disk is chosen so that it represents approximately 1/16th of the entire surface of the plug, and the wall of the tube downstream from the disk is exposed to fluid pressure in use downstream of the control restriction.

18. A device according to claim 17, wherein the disk defines at least one hole so that in use, it is exposed to the same pressure on both sides; optionally wherein the disk defines a plurality of holes.

* * * * *